UNITED STATES PATENT OFFICE.

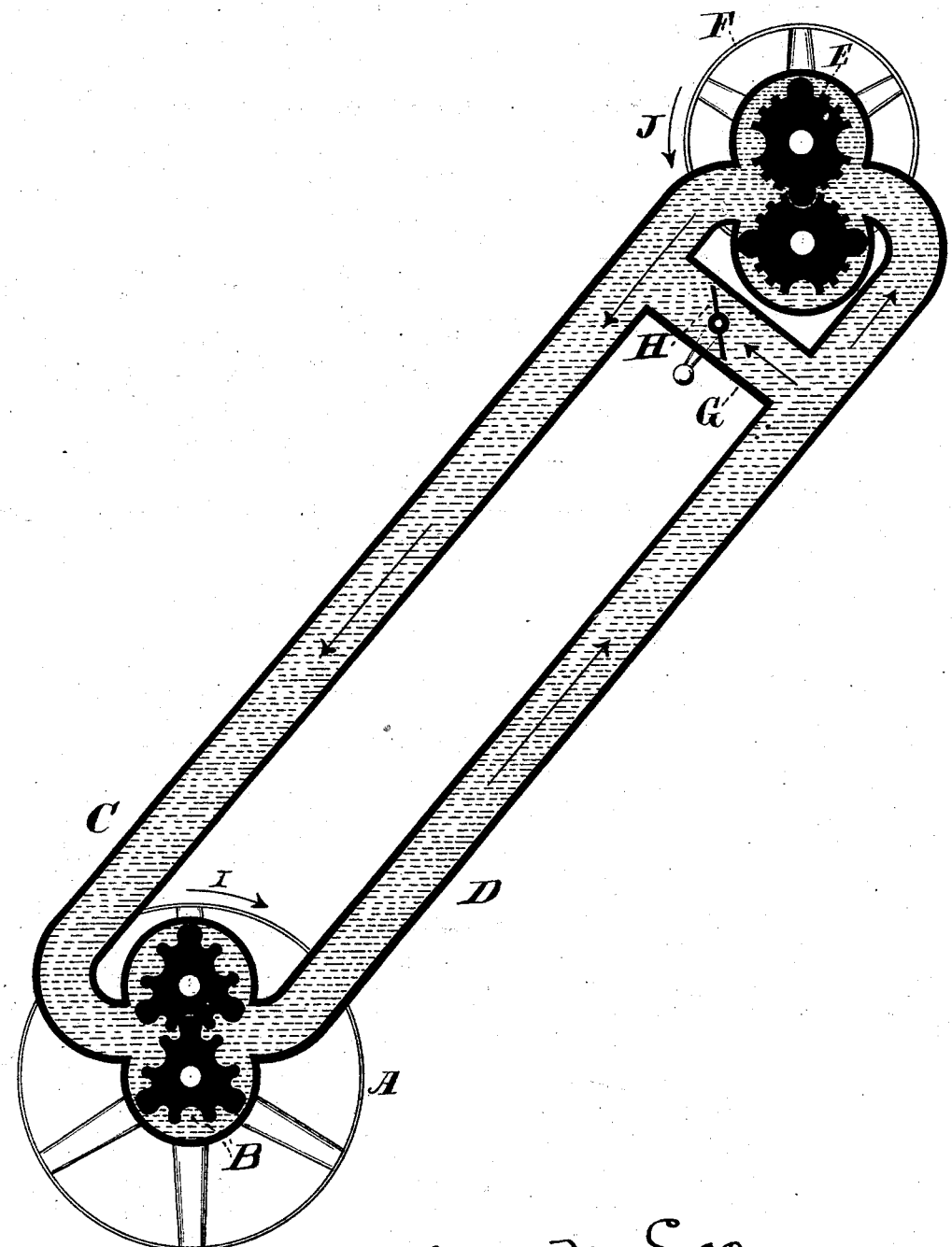

JAMES W. SEE, OF HAMILTON, OHIO, ASSIGNOR OF ONE-HALF TO FRANK X. BLACK AND S. P. CLAWSON, BOTH OF SAME PLACE.

DEVICE FOR TRANSMITTING MOTION.

SPECIFICATION forming part of Letters Patent No. 280,247, dated June 26, 1883.

Application filed November 1, 1881. (No model.)

*To all whom it may concern:*

Be it known that I, JAMES W. SEE, of Hamilton, Butler county, Ohio, have invented certain new and useful Improvements in Means for Transmitting Motion, of which the following is a specification, reference being had to the accompanying drawing, which exhibits the device in section.

This invention pertains to a method and means by which motion may be transmitted from a prime mover to mechanism at a point distant from such prime mover, and simultaneously, if desired, to mechanism intermediate between them; and, also, to a method or means by which such transmitted motion may be caused to act on the receiving mechanism, with an adjustable modification of its velocity.

The invention consists, essentially, of a circuit-conduit in which a liquid is caused to circulate by means of a circulator actuated by a prime mover, or from a prime mover, and an intercepting circulator arranged in said conduit to be actuated by the moving liquid, the liquid forming a complete circuit through the two circulators.

The invention consists, furthermore, of a shunt-conduit in the main conduit arranged to form a short circuit without the intercepting circulator, a regulating-valve being placed in such shunt, whereby a portion of the liquid moving in the main conduit may be permitted to circulate without passing through the intercepting circulator.

In the drawing, C D forms a complete closed circuit conduit.

B is a circulator arranged in the circuit, and A a pulley by which the circulator is driven, power being applied to this pulley in any convenient manner. The form of circulator shown will be at once recognized as an ordinary rotary pump. The office of the circulator B is to cause a forcible circulation of the liquid which fills the circuit-conduit; and any form of rotary pump, rotary engine, or other device which, by means of the application of power to it, will cause such circulation of the liquid, would be the mechanical equivalent of the rotary pump here shown. The circulator may be in the form of a turbine or other water-wheel placed in the circuit, and it may be driven by a belt or by direct attachment to any prime mover, or any proper source of power. The circuit-conduit may be of any desired length, and may lead from the circulator B to a distant neighborhood, to separate parts of a building, to a contiguous machine to which motion is to be transmitted, or it may in its course pass many points to which it is desired to transmit motion.

E is an intercepting circulator placed in the circuit-conduit at any desired distant point. Its nature and functions are similar to those of the circulator B, save that it is a receiver of force, the current of liquid forced through it by the circulator B causing its motion in an obvious manner. This motion may be communicated direct to any desired mechanism, or the attached pulley F may serve as a means for further transmission by belt. The previous statements regarding suitable equivalents for the circulator B can be appropriately applied to the intercepting circulator E. It will be seen that the eduction-orifice of one circulator is joined to the induction-orifice of its mate, and that the direction of motion of the intercepting circulator is governed by its position with relation to the current flow in the conduit.

G is a shunt-conduit, serving to form a short circuit without the intercepting circulator E.

H is a regulating-valve in the shunt-conduit. When the valve H is closed, the shunt is suppressed, and the entire current acts on the intercepting circulator. Adjustment of the valve H serves to short-circuit more or less of the current, and thus modify the force transmitted to and the velocity of the intercepting circulator E.

Aside from the merits of the device as a means for transmitting motion to a distant point, it will at once be seen that its quality as a regulator or graduator of transmitted motion is an important one. In this respect the device may be likened to a machine-belt having a means by which more or less of its motion may be transmitted to its driven pulley in a positive manner.

In the construction of the circulators the short-circuit conduit G may, if desired, be incorporated into their structure, so that the apparatus will consist, simply, of circulators having conduit attachments and conduits joining those attachments.

As many intercepting conduits as are desired may be arranged at different points in the main circuit, and each may be provided with a shunt. By such means motion may be transmitted from a prime mover to many points without the appearance of a moving means of transmission, and without the necessity of locating the various driving and driven machines in line with each other.

The use of a pulsating column of liquid to serve as a means for transmitting a compressive force is not new; but such a system is in no way analogous to the circulating system here set forth.

I claim as my invention—

1. In a machine for transmitting motion and power, a chamber provided with a shaft, having means for inducing a current in a liquid confined therein, a circuit-conduit therefrom to a secondary chamber, provided with means adapted to be operated by said liquid-current, substantially as and for the purpose set forth.

2. A casing provided with two non-directly communicating chambers and two non-directly communicating conduits, each of said chambers having therein means for producing a current in a liquid contained therein, substantially as and for the purpose set forth.

3. In a machine for the transmission and application of motion and power to practical uses, the combination of a driving-shaft, a driven shaft, a body of liquid confined about each of said shafts and in a conduit which completes a circuit about said shafts, and means, substantially as described, for inducing a current in said liquid by the rotation of either of said shafts.

4. The combination of a driving-shaft, a driven shaft, a case or chamber about each, a curved conduit completing a circuit about said shafts, and means, substantially as described, for inducing a current in a liquid confined in said cases and conduit, substantially as shown and described.

5. The combination of pulleys A F, conduit C D, and means, substantially as described, for inducing a current in the conduit, substantially as specified.

6. The combination, with the endless conduit of a transmitting device, as specified, of short-circuit conduit G and valve H.

JAMES W. SEE.

Witnesses:
JOHN R. WOODS,
G. P. TAUGEMAN.